United States Patent
Van Ostrand et al.

(10) Patent No.: US 7,216,016 B2
(45) Date of Patent: May 8, 2007

(54) FAILURE MODE FOR HVAC SYSTEM

(75) Inventors: William F. Van Ostrand, Indianapolis, IN (US); Rajendra K. Shah, Indianapolis, IN (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/824,098

(22) Filed: Apr. 14, 2004

(65) Prior Publication Data

US 2005/0159846 A1 Jul. 21, 2005

Related U.S. Application Data

(60) Provisional application No. 60/537,694, filed on Jan. 20, 2004.

(51) Int. Cl.
*G05B 15/00* (2006.01)
*G05B 21/00* (2006.01)

(52) U.S. Cl. ............ 700/276; 700/277; 236/1 B; 236/1 C

(58) Field of Classification Search ........ 700/276–278; 236/1 R, 1 B, 1 C
See application file for complete search history.

(56) References Cited

U.S. PATENT DOCUMENTS

| | | | |
|---|---|---|---|
| 4,205,381 A * | 5/1980 | Games et al. ............... 700/277 |
| 4,288,990 A * | 9/1981 | Schulz ........................ 62/158 |
| 4,381,549 A * | 4/1983 | Stamp et al. ................. 62/126 |
| 4,414,818 A | 11/1983 | Turbard et al. |
| 4,517,810 A | 5/1985 | Foley et al. |
| 4,682,648 A * | 7/1987 | Fried ........................... 165/209 |
| 4,829,447 A * | 5/1989 | Parker et al. ............... 700/277 |
| 5,276,630 A * | 1/1994 | Baldwin et al. ............ 700/276 |
| 5,348,077 A | 9/1994 | Hillman |
| 5,395,042 A * | 3/1995 | Riley et al. ................ 236/46 R |
| 5,481,481 A * | 1/1996 | Frey et al. .................... 702/82 |
| 5,729,474 A * | 3/1998 | Hildebrand et al. ........ 700/276 |
| 6,119,950 A * | 9/2000 | Albanello et al. ......... 236/46 R |
| 6,427,454 B1 | 8/2002 | West |
| 6,785,592 B1 * | 8/2004 | Smith et al. ................ 700/291 |
| 6,919,809 B2 * | 7/2005 | Blunn et al. ................ 340/632 |
| 2005/0120012 A1 * | 6/2005 | Poth et al. ...................... 707/3 |

OTHER PUBLICATIONS

PCT International Search Report, mailed Aug. 1, 2006.

* cited by examiner

*Primary Examiner*—Leo Picard
*Assistant Examiner*—Sean Shechtman
(74) *Attorney, Agent, or Firm*—Carlson, Gaskey & Olds

(57) ABSTRACT

A HVAC system provides a central control which detects failed stage(s); removes the failed stage(s) from the staging sequence used by the controller; and later checks the failed stage periodically to see if the failed stage has become functional so that the no properly operational stage is returned to a staging sequence. The central control detects the failed stages and/or components by direct communication with the failed stages and/or components and/or by monitoring a temperature of a controlled area to determine if any particular stage is operating properly.

13 Claims, 2 Drawing Sheets

---

DETECT THE FAILED STAGE(S).

A) DIRECT COMMUNICATION OR NO COMMUNICATION WITH THE FAILED EQUIPMENT; AND/OR

B) MONITORING OF THE CONTROLLED AREA TEMPERATURE.

↓

REMOVE THE FAILED STAGE(S) FROM THE STAGING SEQUENCE USED BY THE CONTROLLER.

↓

CHECK THE FAILED STAGE PERIODICALLY TO SEE IF IT HAS BECOME FUNCTIONAL AND RETURN IT TO USE IF IT HAS.

DETECT THE FAILED STAGE(S).
A) DIRECT COMMUNICATION OR NO COMMUNICATION WITH THE FAILED EQUIPMENT; AND/OR
B) MONITORING OF THE CONTROLLED AREA TEMPERATURE.
↓
REMOVE THE FAILED STAGE(S) FROM THE STAGING SEQUENCE USED BY THE CONTROLLER.
↓
CHECK THE FAILED STAGE PERIODICALLY TO SEE IF IT HAS BECOME FUNCTIONAL AND RETURN IT TO USE IF IT HAS.
FIG.3
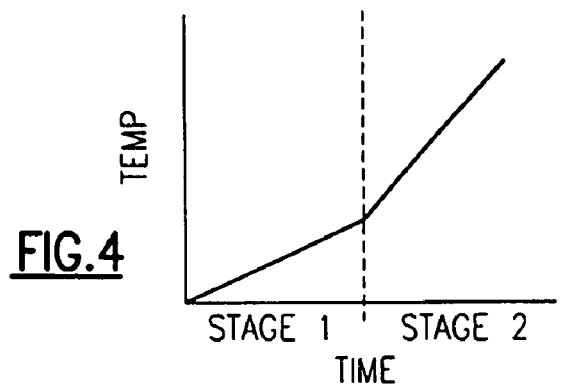
FIG.4
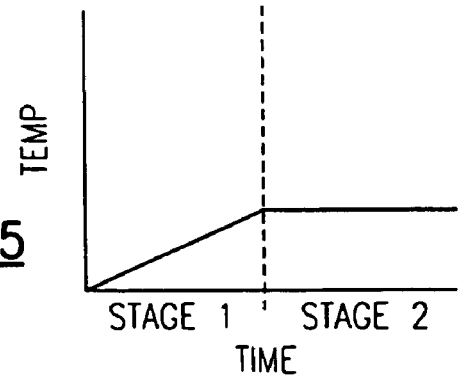
FIG.5

FAILURE MODE FOR HVAC SYSTEM

The present application claims priority to U.S. Provisional Patent Application Ser. No. 60/537,694, filed 20 Jan. 2004.

BACKGROUND OF THE INVENTION

The present invention relates to an HVAC system, and more particularly to bypassing a failed HVAC system component and/or stages to assure at least partial system capacity.

A heating, ventilating, and air conditioning (HVAC) system includes multiple components that function together in a coordinated manner. Typically, an HVAC system includes an indoor unit such as a gas furnace or fan coil, an outdoor unit such as an A/C or heat pump, and a thermostat. More sophisticated systems may include a multi-zone control capacity with zone control and zone dampers. HVAC systems also frequently include subsystems such as filters, humidifiers, and ventilators.

Typical HVAC systems include multiple stages of heating and/or cooling capacity. At the lowest demand, the first (lowest capacity) stage is activated. As demand increases past the capacity of the lowest stage, the next higher capacity stage is activated. If a lower capacity stage has failed, the component will "stage up" past the failed stage until enough capacity is brought on to satisfy the load. However, this may not be optimal as staging delays and temperature drop occur during the time in which the conventional component stages through the failed stage. Moreover, conventional controllers are unaware of failed stages within the remote HVAC components. If the highest capacity stage is the non-functional stage, the control will maintain operation of the system at this highest stage that has failed while providing no conditioning as conditioning demand continues to increase. The result may be complete loss of conditioning.

Accordingly, it is desirable to provide an HVAC system control that identifies and isolates a failed HVAC system and/or stages on a system wide level to assure at least partial system capacity while minimizing delays within a staging sequence by monitoring a temperature of a controlled area. It is further desirable for an HVAC system to learn component and stage capacities such that the specific system performance information is incorporated into the system control algorithm to optimize control over a wide range of system capacities.

SUMMARY OF THE INVENTION

The HVAC system according to the present invention provides a central control which detects the failed stage(s); removes the failed stage(s) from the staging sequence used by the controller; and later checks the failed stage periodically to see if the failed stage has become functional so that the not properly operational stage is returned to a staging sequence.

The central control detects the failed stages and/or components by direct communication with the failed stages and/or components. Alternatively, the central control detects the failed stages and/or components by monitoring the temperature of a controlled area to determine if any particular stage is operating properly. A higher stage having more capacity will create a more positive slope to the controlled environment temperature vs. time curve than a lower stage if the higher stage is properly operating.

The controller also permits the system to automatically determine the HVAC components contained within the system such that capacity information is incorporated into the thermostat's control algorithm to optimize control over a wide range of system capacities, minimizing the requirement for an installer to make gain adjustments.

The present invention therefore provides an HVAC system control that identifies and isolates a failed HVAC system and/or stages on a system wide level to assure at least partial system capacity while minimizing delays within a staging sequence by monitoring a temperature of a controlled area. The present invention also provides an HVAC system which learns component and stage capacities such that the specific system performance information is incorporated into the system control algorithm to optimize control over a wide range of system capacities.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a flowchart illustrating operation of the present invention;

FIG. 4 is a graphical representation of a controlled environment temperature vs. time curve for an operational HVAC component; and FIG. 5 is a graphical representation of a controlled environment temperature vs. time curve for an HVAC component with a malfunction stage.

DETAILED DESCRIPTION OF THE PREFERRED EMBODIMENT

Figure 1:
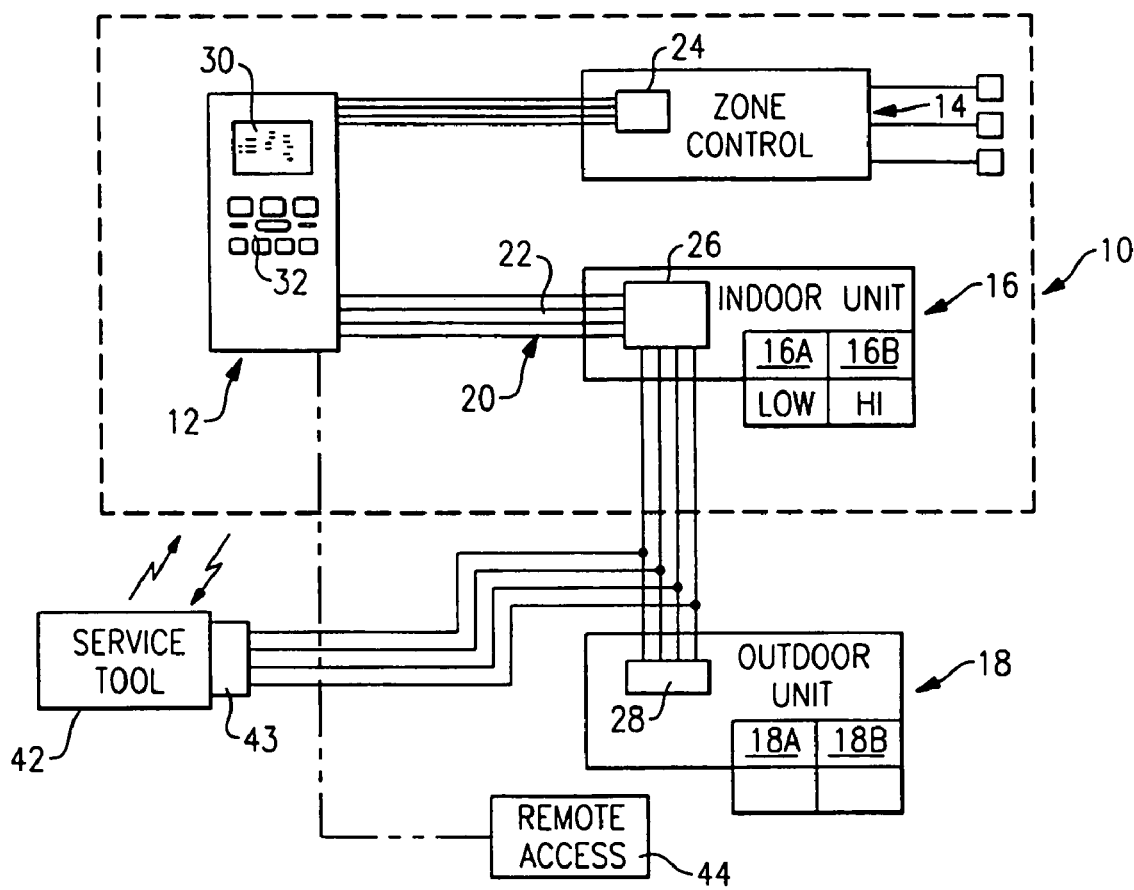
FIG. 1 is a general schematic view of an HVAC system for use with the present invention.

FIG. 1 illustrates a general schematic view of an HVAC system 10. The system 10 generally includes a central controller 12 that communicates with a zone control 14, an indoor unit 16, and an outdoor unit 18. The central controller 12 communicates over a digital communication bus 20. The bus 20 preferably includes four communication paths, such as four wires 22 or the like, which communicate data and power. It should be understood that other communication systems will likewise benefit from the present invention.

The zone control 14 preferably provides thermostat controls for each of several zones and a damper control for dampers associated with each of the zones as generally understood.

The zone control 14 includes a microprocessor controller 24 that communicates with the central controller 12 over the bus 20.

The indoor unit 16 includes an indoor unit microprocessor controller 26, which communicates with the central controller 12 over the bus 20. The indoor unit 16 typically includes a furnace, fan coil, or the like. The indoor unit 16 includes a multiple of indoor stages 16A, 16B. The indoor stages 16A, 16B include for example only, a high stage and a low stage. It should be understood that any number of stages will benefit from the present invention.

The outdoor unit 18, such as an A/C unit or a heat pump, includes an outdoor unit microprocessor control 26, which communicates to the central control 12 over the bus 20. The outdoor unit 18 includes a multiple of outdoor stages 18A, 18B. The outdoor stages 18A, 18B include for example only, a high stage and a low stage. It should be understood that any number of stages will benefit from the present invention.

It should be understood that although a particular component arrangement and communication bus layout is disclosed in the illustrated embodiment, other arrangements will benefit from the instant invention.

The central control 12 includes a display 30, Such as LCD or flat panel display, and input devices 32, such as a plurality of buttons, directional keypad, but alternatively including a mouse, keyboard, keypad, remote device or microphone. Alternatively, the display 30 can be a touch screen display.

Each HVAC system component includes a dedicated microprocessor controllre 24, 26, 28 which communicates with the central control 12 over the data bus 20. Through the bus 20, the conditioning components communicate to the controller 12 system information such as the state of health of the component inculding any stages which have failed.

Figure 2:
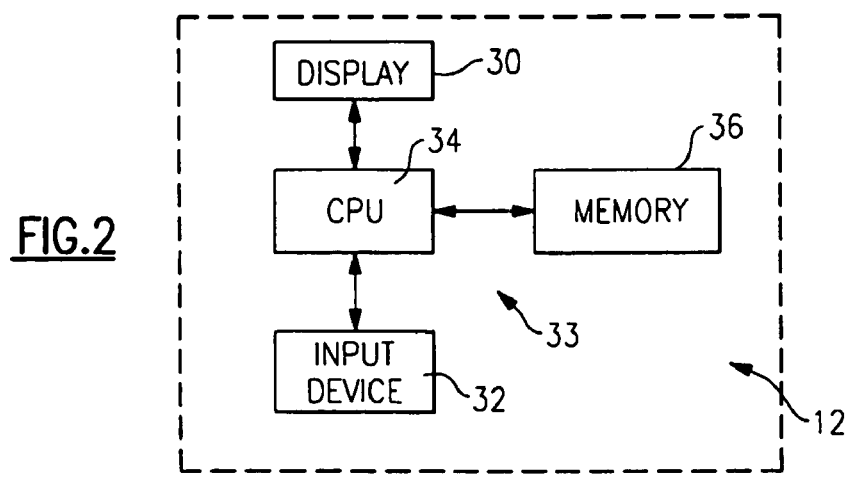
FIG. 2 is a block diagram of a central controller.

The central control 12 preferably operates as a thermostat for the HVAC system 10 and further includes a computer module 33 connected to the display 30 and input devices 32. The computer module 33 generally includes a CPU 34 and a storage device 36 connected to the CPU 34 (FIG. 2). The storage device 36 may include a hard drive, CD ROM, DVD, RAM, ROM or other optically readable storage, magnetic storage, or integrated circuit. The software to control the HVAC system 10 including thermostat control algorithms and the instruction for the display 30 and user interface may also be stored in storage device 36 or alternatively in ROM, RAM or flash memory.

Referring to FIG. 3, the central control 12 determines if a capacity producing component in the system 10 has failed to operate satisfactorily when it is turned on by the central control 12. The central control 12 makes this determination. In a dual fuel HVAC system 10, which for example, includes both a furnace and a heat pump, the heat pump is utilized to provide some capacity to the system should the furnace fail or vice versa. With a dual fuel system, the lowest stage (or two stages in the case of a dual capacity heat pump) are normally followed by two furnace stages, each having higher capacity than the heat pump stage(s). If either the heat pump or the furnace fails, this is communicated to the controller 12 and the controller 12 removes the failed stages from its staging sequence, leaving only the working stages.

Occasionally, there may be internal failures which will result in one of the indoor stages 16A, 16B failing while the other remains operable. When this occurs, the central control 12 identifies the failure and utilizes the operable stage to supply conditioning, and removes the other stage from attempted operation thereby bypassing stage timers and the like so that extended delays common to conventional component "stage-up" systems are overridden. Staging delays and some temperature droop occur as the failed stage is attempted to be used in conventional components. The present invention removes the failed stage from the sequence of available stages, closing the gap and leaving only those that are functional.

Generally, the central control 12 detects the failed stage(s); removes the failed stage(s) from the staging sequence used by the controller; and later checks the failed stage periodically to see if the failed stage has become functional so that the now properly operational stage is returned to a staging sequence.

The central control 12 detects the failed stages and/or components by direct communication or no communication with the failed stages and/or components through communication between the microprocessor controller 24, 26, 28 and the central control 12 over the data bus 20. Alternatively, the central control 12 queries the microprocessor controller 24, 26, 28 and in response to a failure to reply from the microprocessor controller 24, 26, 28, the central control 12 will infer that the stages and/or components as failed.

Alternatively, the central control 12 detects the failed stages and/or components by monitoring a temperature of a controlled area to determine if any particular stage is operating properly. A higher stage, having more capacity, will create a more positive slope to the controlled environment temperature vs. time curve than the stage below it (FIG. 4). If such a response is not identified by the controller 12, the stage is classified as having failed. Once a stage is determined to be inoperable, it is removed from the staging sequence by the controller 12. At the next opportunity for this deleted stage to be used or on a periodic schedule, its "health" is checked again to see if it is available. If it is found to be "healthy," it is returned to the staging sequence. By this means, "self-healing" is detected and the stage will again be utilized if it is available.

It should be understood that an entire component of the system 10 may have failed (example: an entire heat pump) or a stage of that piece of equipment (example: low speed on a two speed heat pump). In either case, only the failed stage or stages are removed from the staging sequence. The process is applied between any successive output states that exist for controller 12, i.e., stages of electric heat or a multi-capacity compressor. This permits a failure in any one of several capacity producing components in a system to be found and identified. Any successive stage that should produce added capacity, but does not, may be deemed to have failed.

The central control 12 monitors the rate of change of a room temperature before and after it turns on the stage. If there is a change in the rate of change of room temperature, it can be inferred that the component is operating. If there is no change in the rate of change, the component can be assumed to be inoperative (FIG. 5). The measurements of rate of change are preferably filtered and timed so that noise and equipment capacity delays do not provide false information.

The amount of change in the rate of change of a room temperature is generally proportional to the amount of added capacity to be brought on by the next stage and the heat loss of the structure. This amount could be determined by storing the designated value into the controller 12 as a fixed value or later programming of the designated value into the controller 12 by a technician during installation.

Alternatively, or in addition, the amount of change in the rate of change is learned by the controller 12 from monitoring the system 10 responses to its outputs over a number of cycles. That is, the controller 12 after a number of cycles "learns" the capacity of each state of the system. When the system does not respond with the learned capacity, the controller 12 infers that there has been a failure. To avoid false indications that might arise (by, for example only, a door being opened at the same time a next stage is turned on), two successive failures are preferably required before an alert is provided.

The "learning" of the system 10 by the controller also permits the system 10 to automatically determine the HVAC components contained within the system 10. For example only, a system 10 will "learn" if it has a single or two speed compressor, single, or multiple stages of electric heat or even if it is a heat pump or an air conditioner in response to monitoring the rate of change of a room temperature and break-points contained therein. This permits a dealer to stock fewer controllers and minimize factory or field selection jumpers thereby simplifying a technician's service call, as the system 10 will essentially configure itself.

Once the equipment capacity has been learned by the controller 12, the capacity information is incorporated into the thermostat's control algorithm to optimize control over a wide range of system capacities, minimizing the requirement for an installer to make gain adjustments. In addition, the system equipment capacity is utilized to optimize the system response to recovery such as from night setback by bringing on the correct capacity at the right time to provide optimum comfort and efficiency. That is, the learned equipment may be utilized by the controller 12 to modify the recovery time for a system component and/or stage which functions sub-optimally or decreases the recovery time for an efficient component to achieve a designated temperature at a desired time. For example only, a failed stage would be "learned" when the controller 12 "learns" the capacity of each state of the system such that the recovery time will be accordingly increased to account for the failed stage to thereby achieve a designated temperature at a desired time. Other time periods may be user input such as the longest time ahead of the setback recovery time at which the equipment should start the recovery.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of computer control of an HVAC system comprising the steps of:
    (1) inferring whether a stage of an HVAC component is a failed stage by:
        (a) monitoring a temperature of a controlled area;
        (b) monitoring a slope of the relationship between the temperature of the controlled area and the time period.
        (c) inferring whether the stage has failed from a relationship between the temperature of the controlled area and a time period; and
    (2) removing the failed stage detected in said step (1) from a staging sequence.

2. A method of computer control of an HVAC system comprising the steps of:
    (1) inferring whether a stage of an HVAC component is a failed stage;
        (a) monitoring a temperature of a controlled area;
        (b) monitoring a rate of change of a relationship between the temperature of the controlled area and the time period.
        (c) inferring whether the stage has failed from a relationship between the temperature of the controlled area and a time period; and
    (2) removing the failed stage detected in said step (1) from a staging sequence.

3. A method of computer control of an HVAC system comprising the steps of:
    (1) monitoring a rate of change of a relationship between a temperature of a controlled area and a time period for a first stage of an HVAC component;
    (2) determining whether the first stage is a failed stage in response to said step (1); and
    (3) removing the failed stage determined in said step (2) from a staging sequence.

4. A method as recited in claim 3, wherein said step (1) further comprises the step of:
    determining whether the rate of change is greater than a prior rate of change of a prior stage of the HVAC component.

5. A method of computer control of an HVAC system comprising the steps of:
    (1) monitoring a rate of change of a relationship between a temperature of a controlled area and a time period for a first stage of an HVAC component and comparing the rate of change to a stored rate of change for the first stage;
    (2) determining whether the first stage is a failed stage in response to said step (1); and
    (3) removing the failed stage determined in said step (2) from a staging sequence.

6. A method as recited in claim 5, further comprises the step of:
    inputting the stored rate of change into a controller which communicates with the HVAC component.

7. A method as recited in claim 5, further comprises the step of:
    learning the stored rate of change over a multiple of cycles of the first stage.

8. A method as recited in claim 7, further comprises the step of:
    determining a configuration of the HVAC component in response to learning the stored rate of change of a multiple of stages comprising the first stage.

9. A method as recited in claim 7, further comprises the step of:
    incorporating a gain into a control algorithm for the first stage in response to the stored rate of change to obtain a desired rate of change.

10. A method as recited in claim 7, further comprises the step of:
    relating a recovery time period to the stored rate of change to achieve a designated temperature at a desired time.

11. A method of computer control of an HVAC system comprising the steps of:
    (1) monitoring a first rate of change of a first relationship between a temperature of a controlled area and a first time period for a first stage of an HVAC component;
    (2) monitoring a second rate of change of a second relationship between the temperature of the controlled area and a second time period for a second stage of the HVAC component;
    (3) determining whether the second stage is a failed stage in response to said steps (1) and (2); and
    (4) removing the failed stage determined in said step (3) from a staging sequence.

12. A method as recited in claim 11, further comprises the step of:
    determining a configuration of the HVAC component in response to said steps (1) and (2).

13. A method as recited in claim 11, wherein said step (3) further comprises the step of:
    determining if the second rate of change is less than the first rate of change; and
    determining that the second stage is a failed stage.

* * * * *